GEORGE W. FROSST.
Improvement in Bolt-Threading Machines.

No. 126,689. Patented May 14, 1872.

Witnesses:
A. Bennerendorf.
W. A. Graham.

Inventor:
Geo. W. Frosst
per
Attorneys.

UNITED STATES PATENT OFFICE.

GEORGE W. FROSST, OF RICHMOND, VIRGINIA, ASSIGNOR TO ARCHER, GOODWIN & COMPANY, OF SAME PLACE.

IMPROVEMENT IN BOLT-THREADING MACHINES.

Specification forming part of Letters Patent No. 126,689, dated May 14, 1872.

Specification describing a new and Improved Bolt-Threading Machine, invented by GEORGE W. FROSST, of Richmond, in the county of Henrico and State of Virginia.

My invention consists of an automatic reversing and stop motion for machines for screw-threading bolts; also applicable for nut-tapping machines.

Figure 1:
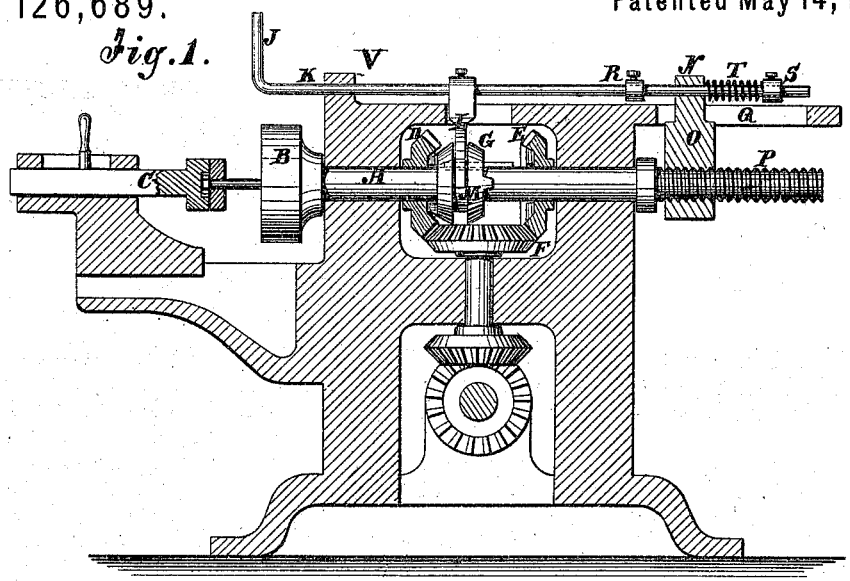
Figure 2:
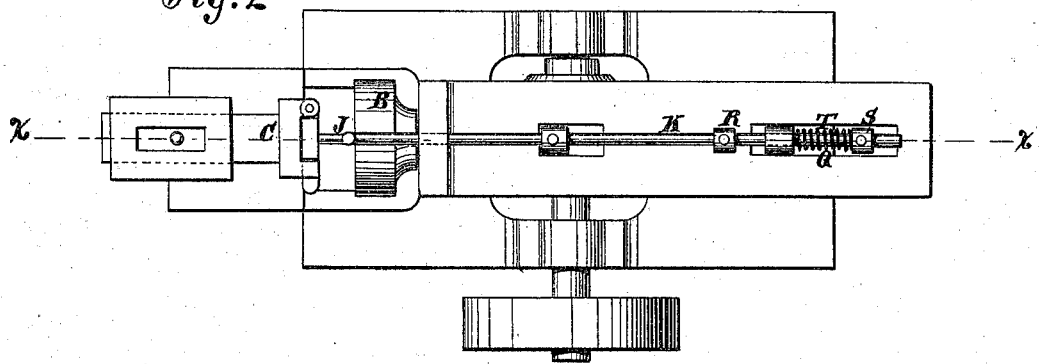
Figure 4:
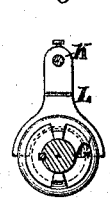
Figure 3:
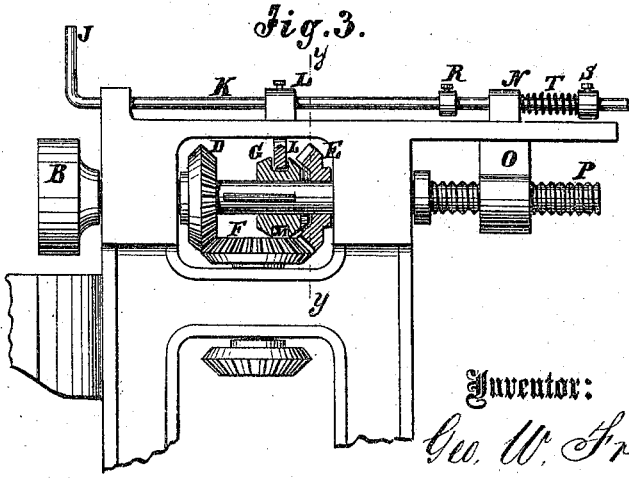

Figure 1 is a longitudinal sectional elevation of my improved machine taken on the line $x\,x$ of Fig. 2. Fig. 2 is a plan view. Fig. 3 is partly a side elevation and partly a sectional elevation; and Fig. 4 is a section on the line $y\,y$ of Fig. 3.

Similar letters of reference indicate corresponding parts.

A is the spindle, and B the die-carrying head, arranged so as not to have endwise motion, the bolt-holder C being fixed to move toward and from the die-head B. Between the bearings of the spindle A there are two bevel-wheels, D E, mounted on it, facing each other, and both gearing with the driving-wheel F turning in a plane at right angles to the planes of said wheels D E. These latter wheels are fitted loosely on the shaft, and between them is a sliding clutch, G, capable of engaging either one, and fixed on a spline or feather, I, so as to turn with the shaft. Said clutch is connected with the rod K by a crotched bar, L, whose crotched part engages the clutch in the annular groove M provided for it. This sliding bar is arranged above the spindle A, and parallel with it; but it may be arranged alongside as well as above. The end J of this rod is cranked or suitably bent to serve as a handle for pulling it forward by the attendant to put the machine in gear when a bolt is adjusted ready for operation, and the front part of said rod is arranged in a fixed bearing, V, to slide forward or back. Near the other end said rod has a bearing in the upper end N of a traversing-block, O, fitted on the screw-threaded tail-end P of the spindle so as to be moved forward or back by said spindle, according to the way it turns. Said block is guided at the upper part in a slot, Q, of the top plate of the machine. On each side of this movable bearing N for rod K there is an adjustable collar, R S, on said rod, held in position by a set-screw; and between collar S and said bearing N is a coiled spring, T, coiled around the rod.

When a bolt has been adjusted in the holder C for being cut the said holder is pushed toward the head B till the end of the bolt bears against the dies in said head B. The operator then pulls rod K forward till clutch G connects with wheel D and thereby sets the spindle in motion, the wheels D and E being kept constantly in motion by the continuously-revolving driver. This wheel D turns the spindle in the right direction for cutting the thread on the bolt, and, in so turning said spindle, moves the block O against the spring T, which is so adjusted in respect of its tension that it will not be strong enough to overcome the friction of the teeth of wheels D and F, which being considerable, owing to the resistance of the cutting-dies, tends to keep them together until the bolt is cut the required distance from the end. Then the said spring, having accumulated sufficient force by its contraction, will throw said clutch out of connection with wheel D and into connection with wheel E, thereby reversing the motion of the spindle to discharge the cut bolt. By this reverse motion the screw P moves the block O back to the left, and said block comes against collar R as soon as the bolt has been discharged, and moves rod K and clutch G forward till it disconnects with wheel E, and then the spindle stops, ready for being put in gear again when the cut bolt has been removed and a new blank put in the head.

Having thus described my invention, what I claim as new, and desire to secure by Letters Patent, is—

The combination of the sliding rod K, having the crotched bar L, collars R and S, and the spring T, with the die-carrying spindle A, having the loose wheels D E, clutch G, and the movable block O, all arranged and operating substantially as specified.

GEORGE W. FROSST.

Witnesses:
RICHD. M. BOLLING,
CHAS. E. BOLLING.